(12) United States Patent
Wyschogrod et al.

(10) Patent No.: US 7,305,391 B2
(45) Date of Patent: *Dec. 4, 2007

(54) SYSTEM AND METHOD FOR DETERMINING THE START OF A MATCH OF A REGULAR EXPRESSION

(75) Inventors: Daniel Wyschogrod, Newton, MA (US); Leonid Leibman, Weston, MA (US)

(73) Assignee: SafeNet, Inc., Belcamp, MD (US)

( * ) Notice: Subject to any disclaimer, the term of this patent is extended or adjusted under 35 U.S.C. 154(b) by 475 days.

This patent is subject to a terminal disclaimer.

(21) Appl. No.: 10/773,595

(22) Filed: Feb. 6, 2004

(65) Prior Publication Data

US 2004/0162826 A1   Aug. 19, 2004

Related U.S. Application Data

(60) Provisional application No. 60/445,620, filed on Feb. 7, 2003.

(51) Int. Cl.
*G06F 7/00* (2006.01)

(52) U.S. Cl. ......................................................... 707/6
(58) Field of Classification Search ...................... None
See application file for complete search history.

(56) References Cited

U.S. PATENT DOCUMENTS

| | | |
|---|---|---|
| 4,450,520 A | 5/1984 | Hollaar et al. |
| 4,901,352 A | 2/1990 | Watari |
| 6,856,981 B2 * | 2/2005 | Wyschogrod et al. ......... 706/48 |
| 7,036,106 B1 * | 4/2006 | Wang et al. ................... 716/18 |
| 7,046,848 B1 * | 5/2006 | Olcott ......................... 382/176 |
| 2003/0051043 A1 | 3/2003 | Wyschogrod et al. |
| 2003/0093416 A1 | 5/2003 | Akaboshi et al. |
| 2003/0110208 A1 | 6/2003 | Wyschogrod et al. |
| 2003/0187633 A1 | 10/2003 | Fairweather |
| 2003/0195874 A1 | 10/2003 | Akaboshi |
| 2003/0229852 A1 * | 12/2003 | Uramoto et al. ............. 715/513 |

* cited by examiner

*Primary Examiner*—Susan Chen
(74) *Attorney, Agent, or Firm*—Drinker Biddle & Reath LLP (57) ABSTRACT

A method for determining the start of a match of a regular expression using the special state table, the set of start state registers and the DFA next state table, includes the step of determining from the regular expression each start-of-match start state and each end-of-match terminal state. For each start state, a start state entry is loaded into the special state table. For each terminal state, a terminal state entry is loaded into each special state table. The next state table is used to return the next state from the current state and an input character. When a start state is encountered, the current offset from the beginning of the input character string is loaded into the start state register. When a terminal state is encountered, the terminal state entry is retrieved from the special state table, and the value of the start state register corresponding to the rule number of the terminal entry in the special state table is further retrieved. The value of the start state register which is retrieved indicates the location in the character string where the start-of-match occurred for a particular rule.

1 Claim, 7 Drawing Sheets

SYSTEM AND METHOD FOR DETERMINING THE START OF A MATCH OF A REGULAR EXPRESSION

CROSS-REFERENCE TO RELATED APPLICATIONS

This application is related to U.S. provisional patent application Ser. No. 60/445,620, filed Feb. 7, 2003, and entitled "System and Method for Determining the Start of a Match of a Regular Expression", the disclosure of which is incorporated herein by reference.

BACKGROUND OF THE INVENTION

1. Field of the Invention

This invention generally relates to pattern recognition of character strings using regular expressions, and more particularly relates to methods and engines for searching character strings for patterns and determining the start of a matching pattern.

2. Description of the Prior Art

Regular expressions are formuli used for matching character strings that follow some pattern. They are made up of normal characters, such as upper and lower case letters and numbers, and "metacharacters", which are symbols, such as / * | [ ], or the like, that have special meanings. Regular expressions are well known in the art, and for a more complete explanation of what they are and how they are used in pattern matching, reference should be made to *Mastering Regular Expressions*, by Jeffrey E. F. Friedl, published by O'Reilly and Associates, Inc., the disclosure of which is incorporated herein by reference.

Two different regular expression ("regex") engines commonly used for searching for patterns in a character string are a non-deterministic finite state automaton (NFA) and a deterministic finite state automaton (DFA). Again, reference should be made to the aforementioned publication, *Mastering Regular Expressions*, for a more complete explanation of how an NFA and a DFA function.

Figure 1:
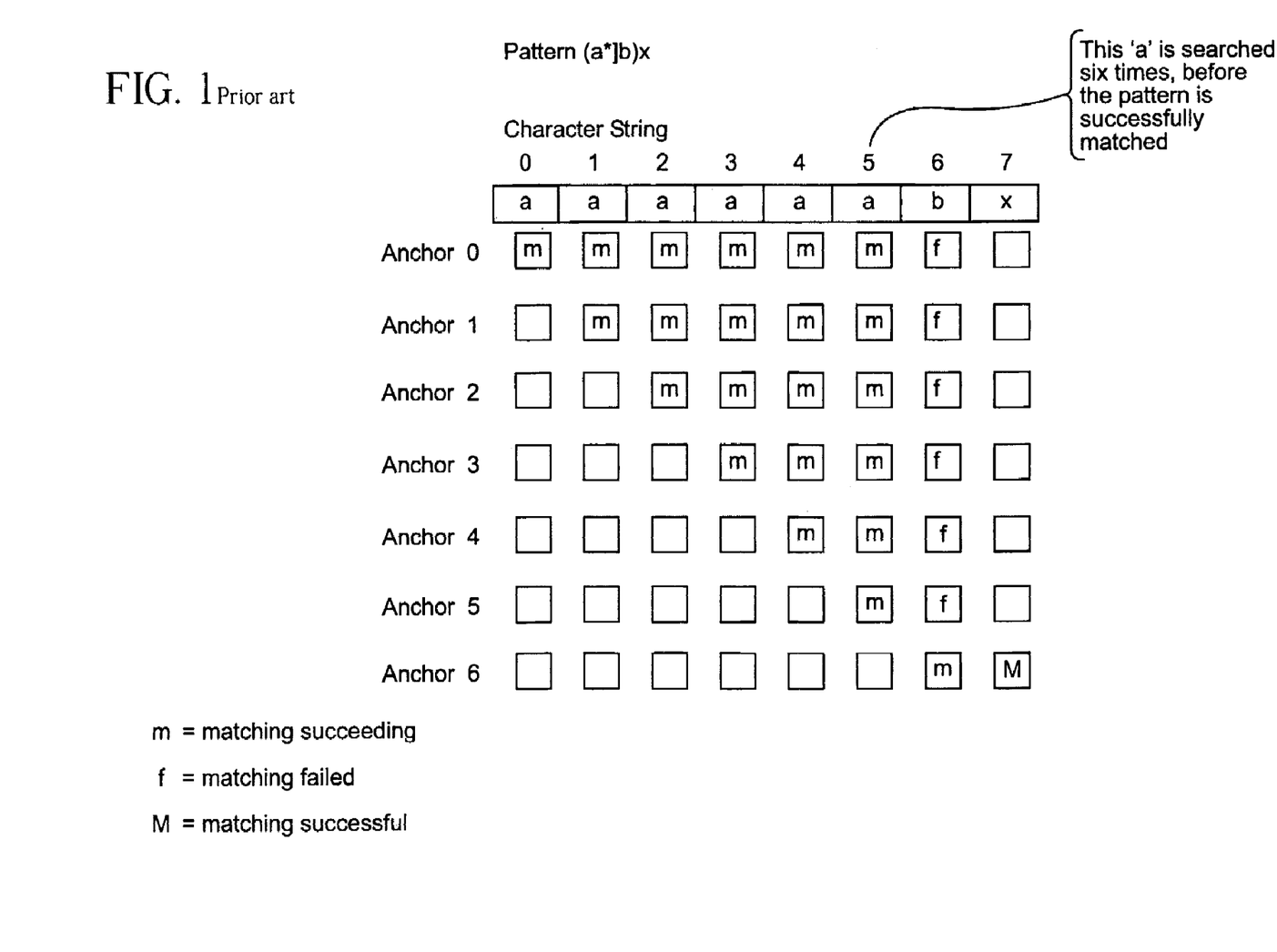
FIG. 1 is an illustrative block diagram representation of a conventional method for matching a regular expression.

FIG. 1 illustrates one conventional pattern matching scheme using either an NFA or a DFA. In this example, the pattern to be matched is expressed as the regex (a*|b)x. The character string being sampled is eight characters long, for this particular illustrative example.

In the example shown in FIG. 1, the first step (Step 1) in this conventional method of pattern matching is where the pattern is anchored at the first character in the string, which is character no. 0 and which is the character "a". The matcher (i.e., the NFA or DFA) consumes characters until it reaches a failure state, which for the first step (Step 1) in the method occurs at character no. 6 in the string (which is the lower case letter "b"). In the example, it should be noted that "m" represents a successful match, "f" represents that the match has failed, and "M" represents that the match is successful.

In the second step (Step 2) of this method of pattern matching, the pattern is now anchored at the second character in the string (i.e., character no. 1), which is also the lower case letter "a". The pattern begins matching at character no. 1 and, again, fails at character no. 6 (i.e., the seventh character in the string), which is the lower case letter "b". Thus, it should be noted that the pattern matcher (i.e., the NFA or DFA), in Step 2, has now gone over six characters that have already been considered in Step 1 of the pattern matching method. Thus, for a character string of eight characters, and for the given pattern of /(a*|b)x/, expressed as a regex, 29 characters must be considered before a match is found. As shown in FIG. 1, the match occurs in Step 7, where the pattern is anchored at character no. 6.

The advantage of this scheme is that the start and the end of the match are known. The disadvantage is that, in the worse case situation, $n^2$ characters must be considered, where n is the length of the input string. Thus, if m patterns are to be considered simultaneously using this conventional method, and a separate pass is made on the input string for each pattern, the total number of comparisons performed is $m \times n^2$.

Another method of pattern matching using regular expressions is described below. If, for example, there were two patterns, one of which is expressed by the regex /(a*|b)x/, as in the example given above and shown in FIG. 1, and the other pattern is the regex /pqr/, the two patterns may be combined into the following pattern: /.*(a*|b)x|.*pqr/

This particular pattern will succeed only if either of the original patterns succeed (i.e., are matched), and the end of the match for this combined pattern will occur in the same place as if the original patterns were searched individually. What is more, the pattern matcher will find the match after considering at most n characters, since the pattern is anchored at the first character and will run from there.

The problem, however, with this second pattern matching scheme is that it is unclear where the start of match occurs. (The end of the match is known, as the matcher knows the character number when a terminal or accepting state is reached.)

OBJECTS AND SUMMARY OF THE INVENTION

It is an object of the present invention to provide a method for matching a pattern in a character string.

It is another object of the present invention to provide a method of pattern matching which determines the start of a match of a pattern expressed as a regular expression.

It is still another object of the present invention to provide a system for matching a pattern in a character string and for determining the start of the match.

It is a further object of the present invention to provide a hardware engine that supports the pattern matching method of the present invention.

It is still a further object of the present invention to provide a regular expression to DFA compiler that produces transition and other tables for the hardware engine.

It is yet a further object of the present invention to provide a system and method for determining the start of a match of a regular expression which overcomes the disadvantages inherent with conventional systems and pattern matching methods.

In one form of the present invention, a system for determining the start of a match of a regular expression includes a special state table that contains start entries and terminal entries, and a set of start state registers for holding offset information. The system further includes a DFA next state table that, given the current state and an input character, returns the next state. A settable indicator is included in the DFA next state table corresponding to each next state table entry which indicates whether to perform a lookup in the special state table. A compiler loads values into the special state table based on the regular expression.

A method in accordance with one form of the present invention for determining the start of a match of a regular expression using the special state table, the set of start state registers and the DFA next state table, includes the step of determining from the regular expression each start-of-match start state and each end-of-match terminal state. For each start state, a start state entry is loaded into the special state table. For each terminal state, a terminal state entry is loaded into each special state table. The next state table is used to return the next state from the current state and an input character. When a start state is encountered, the current offset from the beginning of the input character string is loaded into the start state register. When a terminal state is encountered, the terminal state entry is retrieved from the special state table, and the value of the start state register corresponding to the rule number of the terminal entry in the special state table is further retrieved. The value of the start state register which is retrieved indicates the location in the character string where the start-of-match occurred for a particular rule.

DETAILED DESCRIPTION OF THE PREFERRED EMBODIMENTS

It was previously described with respect to the second conventional method of pattern matching that, if m patterns are combined into a single DFA, the end of each match for each pattern can be determined in a single pass, i.e., after considering at most n characters, where n is the length of the character input string. If the DFA is implemented in hardware, the matches can be performed at high rates, e.g., in the gigabit range and higher. The system and method of the present invention incorporate these advantages, and further have the ability to find the start-of-match location for each of r patterns, where r is less than or equal to m and is limited only by the practical hardware constraints of the system. The methodology of the present invention will be described herein, as well as a hardware engine that allows the implementation of the present method for determining the start-of-match of a regular expression, and a modified regular expression to DFA compiler that produces transition tables and the like for the hardware engine.

Figure 2:
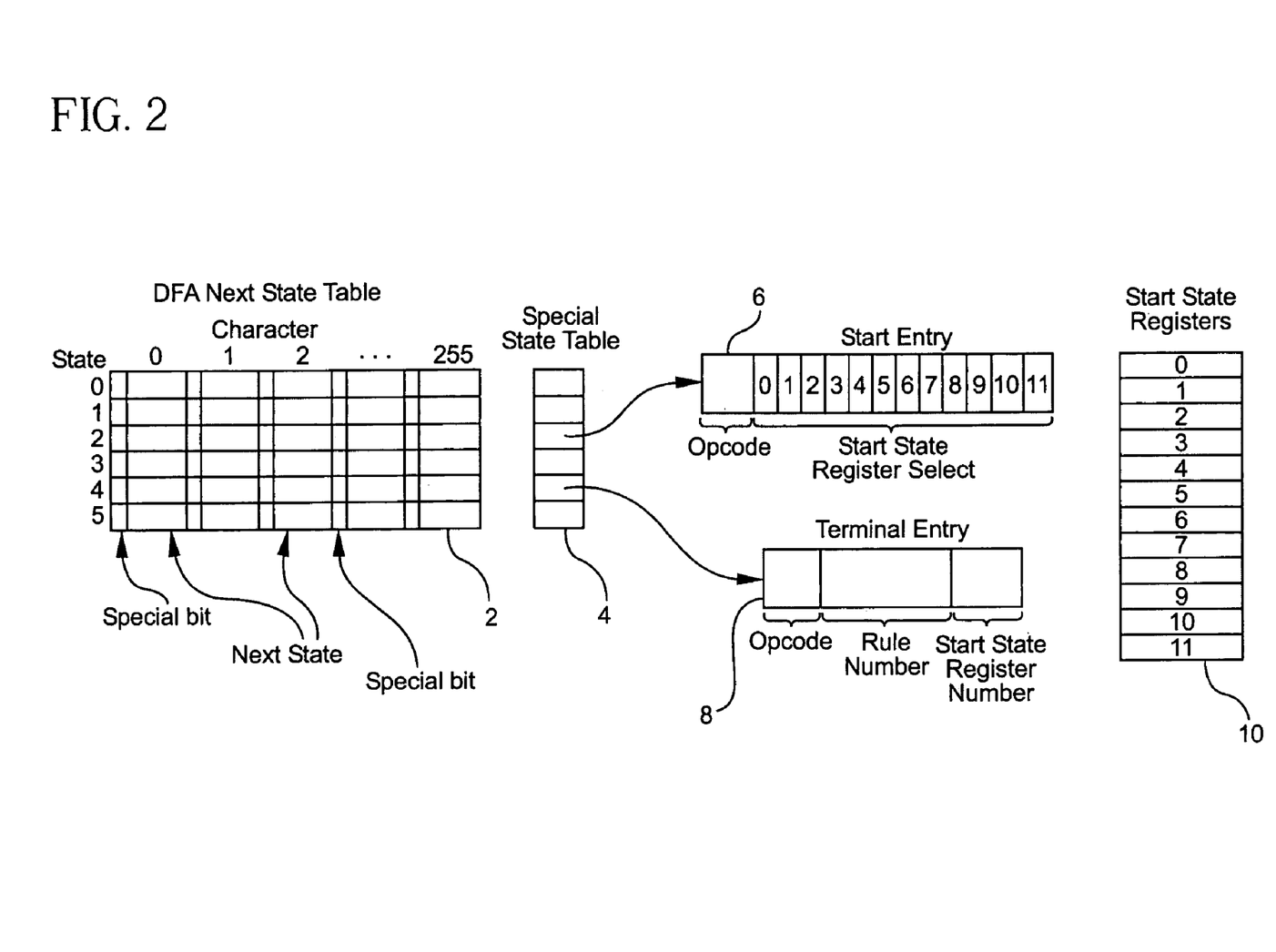
FIG. 2 is a block diagram which illustrates in accordance with one form of the present invention the hardware used to carry out the method of determining the start of a match of a regular expression.

Turning initially to FIG. 2 of the drawings, a preferred embodiment of the hardware engine formed in accordance with the present invention is schematically depicted. The hardware engine first includes a DFA next state table 2, also commonly referred to as a state transition table. The DFA next state table 2 is similar in may respects to a conventional transition table in that, given the current state of the DFA and an input character from a character string, it returns the next state. However, in accordance with the present invention, the DFA next state table 2 includes a special bit for each next state entry.

More specifically, the DFA next state table, as shown in FIG. 2, includes a plurality of columns and a plurality of rows. Each column is headed by a character (0, 1, 2, . . . 255), which represents, for example, each of the alphanumeric characters and other symbols one would find on a computer keyboard and possibly elsewhere. The input characters may be represented by a seven or eight bit ASCII (American Standard Code for Information Interchange) code. For example, character no. 97 may represent the lower case letter "a", and character no. 98 could represent the lower case letter "b". Thus, input character "a" and input character "b" would each head up one column in the DFA next state table. As in a conventional transition table, the rows are designated by the current states of the DFA. The intersection of a current state row and a current input character column defines the next state of the DFA, which may be represented by a binary code. The DFA next state table 2 may be stored in a memory, such as a read-only memory (ROM) or a random access memory (RAM), or in another memory of the computer or other device which is used as the pattern matcher. The memory is generally referred to hereinafter as the automaton memory 3, as it is operatively associated with the finite state automaton.

In accordance with the present invention, the DFA next state table 2 further includes a special bit appended to each next state in the table. The special bit, which may be a binary bit, such as a binary "0" or a "1", signifies that the next state in the transition table is a "special" state, in that it is either a start state, a terminal state, or both. When the special bit is set, such as by having a binary "1" in the special bit position, a lookup is performed in a special state table 4, which forms part of the present invention. As shown in FIG. 2, this special state table 4 includes at least one of two types of entries. The first is a start entry 6 and the second is a terminal entry 8. It should be realized that the special state table may include a start entry and a terminal entry corresponding to the same state in the special state table.

The special state table 4 is a one or more dimensional array containing information about each state which is considered a "special" state. In other words, in the DFA next state table 2, if the next state is determined to be a "special" state, denoted by the special bit being set, a lookup is performed in the special state table 4 for information concerning that designated special state. The information is preferably a 16 bit word for each special state, although it may be longer or shorter, as required.

If the special state is a start state, then the 16 bit word contained in the special state table 4 for that particular state has start entry information. If the special state is a terminal state, then the 16 bit word for that particular special state includes terminal entry information.

As shown in FIG. 2, the start entry information includes, preferably, a four bit opcode, which indicates whether the state is a start state or a terminal state. Of course, it should be realized that a greater or lesser number of bits than four may be included as signifying the opcode. Only one bit is actually required, but the opcode may serve other purposes.

The start entry information further preferably includes 12 additional bits which define a "start state register select" code. Each bit of the start state register select code will either be a binary "1" or a binary "0", and will designate a particular rule number or pattern (i.e., regular expression) that is to be matched. In the example shown in FIG. 2, there are 12 start state register select bits and, accordingly, there are 12 possible patterns that may be matched in this particular DFA. However, as mentioned previously, the start entry 6 may be longer or shorter than 16 bits and, correspondingly, the DFA and may include more or less than 12 patterns that are being matched.

If the special state is a terminal state, then the preferred 16 bit word stored in the special state table 4 for that particular state will have terminal entry information, as shown in FIG. 2. The preferred 16 bit terminal entry 8 includes a four bit opcode, which indicates whether that special state is a start state or a terminal state, or both. The remaining 12 bits of the terminal entry 8 designates the particular rule number of the pattern to which that terminal state relates, and the start state register number, which also would correspond to the start state register select code of the start entry information.

The special state table 4 is, essentially, a lookup table containing binary information. Accordingly, like the DFA next state table 2, it too may be stored in a ROM or RAM, or more generally, in the automaton memory.

As shown in FIG. 2, the hardware engine of the present invention would further include a plurality of start state registers 10, shown as a column in FIG. 2. Each register corresponds to a particular rule number or pattern being matched by the DFA. There are 12 registers which are shown by way of example in FIG. 2 for the start state registers 10. However, it should be understood that there may be more or less registers than that shown in FIG. 2, depending upon the number of patterns or rules being matched, preferably simultaneously, by the DFA.

In each start state register 10, there is corresponding information, in the form of a binary word, stored therein which denotes the offset from the beginning of the character string being tested, in other words, the distance, in characters, from the beginning of the input character string to the current character which caused the DFA to transition to a start state corresponding to that particular rule number or pattern. This offset information, accordingly, signifies and defines where in the character string the start of a match for that particular rule or pattern is located. It should be noted that the end-of-match is already known, as it is the location of the current character in the character string which caused the DFA to transition to a terminal state, and this location is known by the pattern matcher. Thus, in accordance with the present invention, the start and end for each regular expression, or pattern, may be determined.

Figure 3:
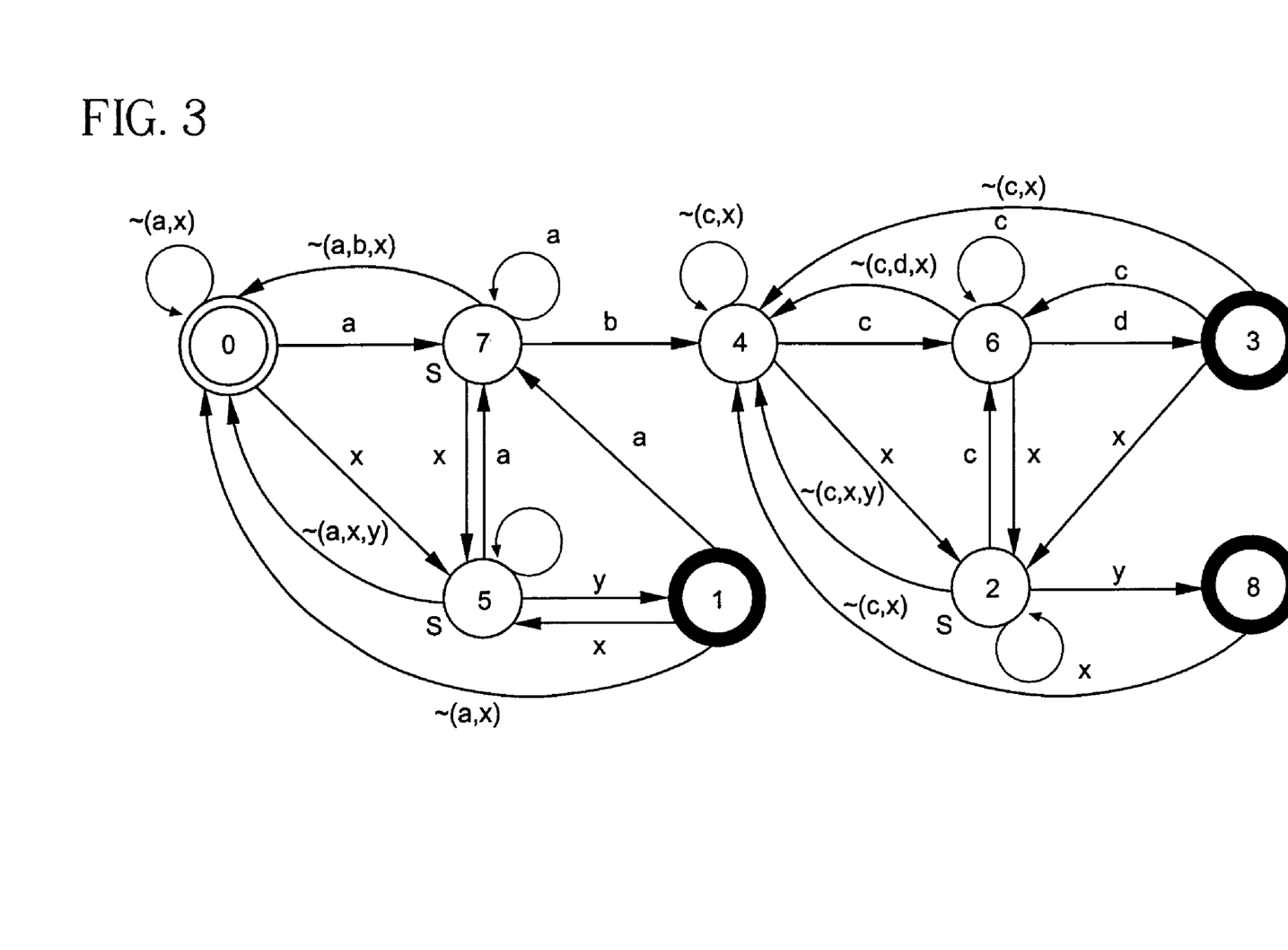
FIG. 3 is a state transition diagram, in block diagram form, of an illustrative example of how the system and method of the present invention operate.
Figure 4:
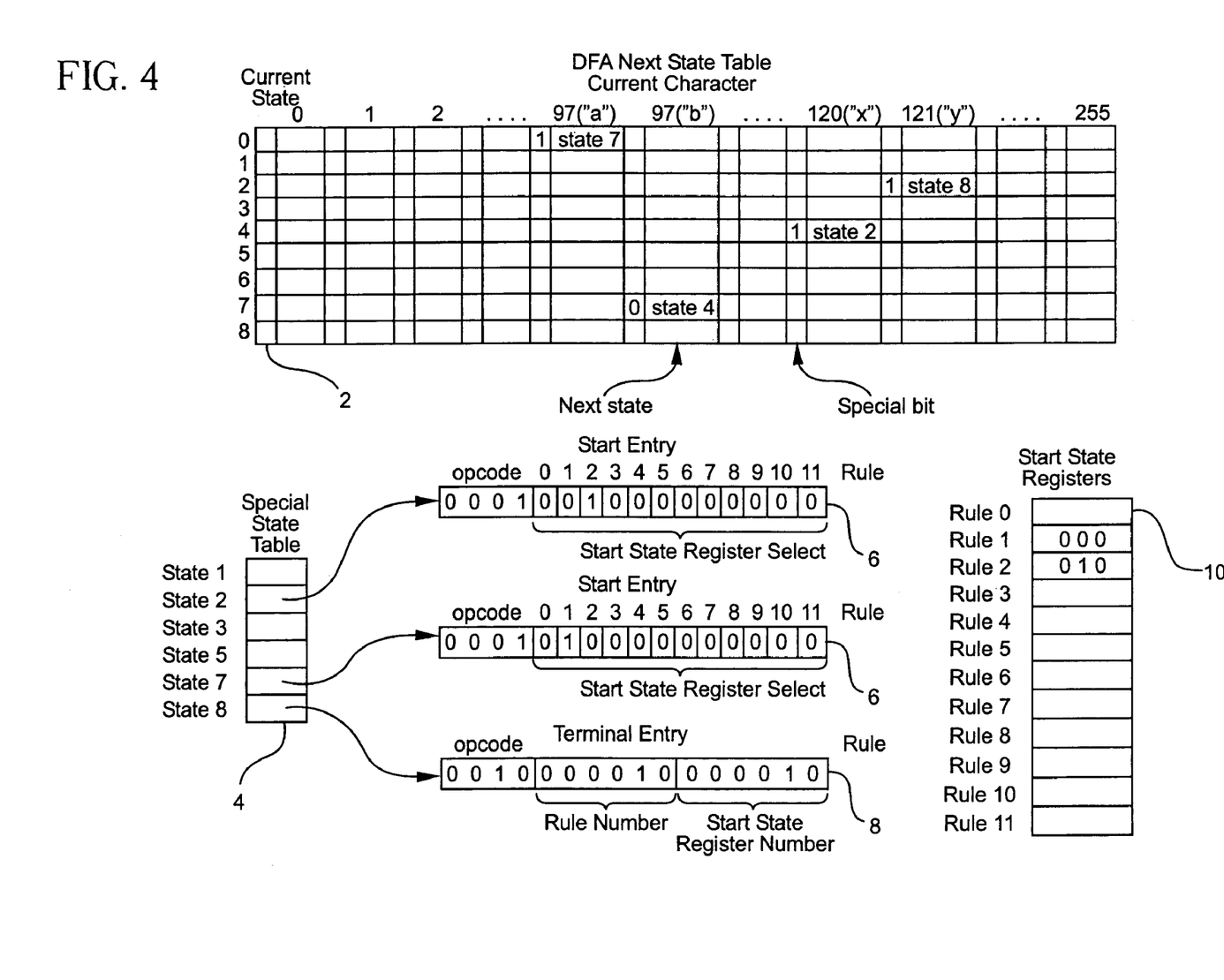
FIG. 4 schematically represents, in block diagram form, the operation of the system and method of the present invention in determining the start of a match of each rule of the DFA illustrated by the state transition diagram shown in FIG. 3.

An example illustrating how the method and hardware engine used for determining the start of a match of a regular expression operates is shown in FIGS. 3 and 4. More specifically, FIG. 3 shows the DFA for the pair of rules (i.e., regular expressions, or patterns) /.*ab.*cd/ and /.*xy/, which are referred to herein as Rule 1 and Rule 2, respectively. For each terminal state, which can be seen from the DFA in FIG. 3 as being states 1, 3 and 8, a terminal state entry 8 is added to the special state table, and the corresponding special bits for those states (as next states) are set in the DFA next state table 2. As can be seen from the state transition diagram of FIG. 3, state 1 is a terminal state for Rule 2, state 3 is a terminal state for Rule 1 and state 8 is also a terminal state for Rule 2. Thus, the terminal entry 8 in the special state table 4 for state 1 would designate Rule 2 as the particular rule number of the pattern to which that terminal state relates, and would further designate the start state register number as "2". Similarly, the terminal entry 8 for state 3 would designate Rule 1 as the rule number and "1" as the start state register number, and the terminal entry 8 for state 8 would designate Rule 2 as the rule number "2" as the start state register number.

As can further be seen from the DFA of FIG. 3, there are also three start states, that is, states 7, 5 and 2. The corresponding special bits for each of states 7, 5 and 2 (as next states) are set in the DFA next state table 2. Furthermore, for state 7, the corresponding start entry has its start state register select code with a particularly designated bit for Rule 1 on, since this would be the reported start state if Rule 1 matched at state 3, which is a terminal state for Rule 1. For state 5, the corresponding start entry has its start state register select code with a particularly designated bit for Rule 2 set, and for state 2, the corresponding start entry would also have the Rule 2 bit set in its start state register select code. It should be noted that, because of the metacharacter ".*" construct between the two patterns (i.e., Rule 1 and Rule 2) in the regular expression, the start state for Rule 2 at start 8 actually occurs at state 2, which is quite far from the global start state, i.e., state 0.

For the DFA of FIG. 3, the DFA next state table 2 shown in FIG. 4 has been selectively completed with the more pertinent information to facilitate an understanding of the invention. It should be noted that in the DFA next state table, the special bits are set with a binary "1" for each next state which is designated as a special state. This includes the start states (i.e., states 7, 5 and 2), and the terminal states (i.e., states 1, 3 and 8). The special bits for all other next states which are not considered special states are not set, as reflected by the binary "0" for each corresponding special bit.

Assume that the first character in the character string inputted to the DFA is a lower case "a", which is no. 97 in ASCII code, or in binary would be 01100001. It should be remembered that, because of the metacharacter ".*" construct of the two regular expressions (i.e., Rule 1 and Rule 2), zero or more characters may precede either rule in the character string. However, to simplify the explanation of the invention, it will be assumed that a lower case "a" is the first character in the input character string.

In accordance with the DFA next state table 2, and as clearly shown in the state transition diagram for the DFA in FIG. 3, for the row headed by current state 0 and the column headed by no. 97, corresponding to the current input character "a", the next state when an "a" is received would be state 7. Since state 7 is a start state for the regular expression /.*ab.*cd/ (Rule 1), the special bit will be set to a binary "1" in the DFA next state table next to the entry for state 7.

This special bit, being set to a binary "1", indicates that that particular next state (state 7) is a special state. In accordance with the method of the present invention, a lookup is performed in the special state table 4. As shown in FIG. 4, the special state table for state 7 includes a start entry 6, since state 7 is a start state. The start entry 6 would have a four bit opcode, such as "0001", indicating that state 7 is a start state. Furthermore, the start entry would have bits 5-16 as being "010000000000" as the start state register select. This code would indicate that state 7 is a start state for Rule 1, since the second bit in from the beginning of the start state register select code would be on (e.g., a binary "1") in the bit slot for Rule 1.

The hardware engine would then go to the start state registers 10, and for the register corresponding to Rule 1, the current offset from the beginning of the input character string would be entered in that register. In this case, since a lower case "a" was received as the first character in the string, the start state register for Rule 1 would have a binary "000" entered into it, which would indicate that the start of a match for Rule 1 (i.e., the first regular expression or pattern described previously) occurred on the first character in the character string, with 0 offset.

Now, assume that the next character in the input character string is a lower case "b". As can be seen from the transition diagram of FIG. 3, a lower case "b" as an input character would cause the DFA to go from state 7 to state 4. It should be noted that state 4 is neither a start state nor a terminal state.

Turning now to the partially completed DFA next state table 2 shown in FIG. 4, for this particular example, for the row headed by current state 7 and the column headed by current character no. 98 (a lower case "b" is number 98 in an ASCII code, or in binary, 01100010), the next state at the intersection of that particular row and column is designated as state 4. Since, as mentioned previously, state 4 is not a special state in that it is neither a start state nor a terminal state, the special bit corresponding to state 4 is not set and is designated by a binary "0". There would be no entry in the special state table for state 4, as it is not a special state, and no lookup is performed in the special state table 4, since the special bit corresponding to state 4 in the next state table is not set (it is a binary "0").

Next, assume that a lower case "x" is the next character in the input character string. According to the transition diagram of FIG. 3, a lower case "x" as the next character would cause a transaction from state 4 to state 2. State 2 is a start state for Rule 2, that is, the regular expression /.*xy/. In the DFA next state table 2 shown in FIG. 4, for the row headed by current state 4 and the column headed by current character no. 120 (a lower case "x" is no. 120 in ASCII code, or in binary, it would be 01111000), the table would yield a next state as state 2. Since state 2 is a start state for Rule 2, a special bit will be set in the DFA next state table 2 adjacent to next state entry (state 2), such as by having the special bit as a binary "1". Since the special bit is set, indicating that state 2 is a special state, a lookup is performed in the special state table 4 for state 2.

Since state 2 is a start state, a start entry 6 would be found in the special state table 4 corresponding to state 2. The start entry 6 would have an opcode indicating that state 2 is a start state, such as by the binary code 0001. The start entry would further have a 12 bit start state register select code following the opcode in which the Rule 2 bit slot would be set with a binary "1", so that the start state register select 12 bit code would appear as "001000000000". Thus, the start entry for state 2 would indicate that state 2 is a start state for Rule 2, i.e., the second regular expression or pattern described previously.

The start state registers 10 are then accessed and, as illustrated by FIG. 4, the current offset for the register corresponding to Rule 2 for when the lower case "x" appeared in the input character string, from the start of the string, would be entered. In this particular example, the lower case "x" was received two characters after the beginning of the input character string. Accordingly, a binary "010" would be entered into the start state register for Rule 2.

To complete the example, assume that the next character in the input character string is a lower case "y". As can be seen from the transition diagram of FIG. 3, a lower case "y" as the next character would cause a transition from state 2 to state 8. State 8 is a terminal state for Rule 2, which is the regular expression /.*xy/. Turning now to the DFA next state table 2 shown in FIG. 4, for the row headed by current state 2 and the column headed by current character no. 121 (a lower case "y" is number 121 in ASCII code, or a binary 01111001), the intersection of that particular row and particular column would yield a next state as state 8. Adjacent state 8 as the next state in the table would be its corresponding special bit, which would be set, as indicated by a binary "1". This is because state 8 is a special state.

In accordance with the method and hardware engine of the present invention, a lookup is now performed in the special state table 4. For state 8, the special state table 4 would include a terminal entry 10 as preferably a 16 bit word, since state 8 is a terminal state for Rule 2. For example, the terminal entry 10 would have a four bit opcode of 0010, or 0000, or any desired code indicating that state 8 is a terminal state. Following the opcode would be a "rule number" code, indicating the rule number for which state 8 is a terminal state. The rule number may be, for example, a six bit binary code which, in this case, could be the binary "000010", which would correspond to and indicate Rule 2 as being the rule number for which state 8 is a terminal state. Following the rule number code in the terminal entry 8 is the start state register number code, which would indicate the start state register corresponding to Rule 2. This may also be a six bit code, for example, and in this particular example, the start state register number would be represented by the binary code "000010".

The pattern matcher of the present invention now looks in the start state register 10 for Rule 2 to find the current offset stored therein. As stated before, the offset stored in the start state register for Rule 2 is the binary code "0010", which indicates that the start of the regular expression /.*xy/, that is, Rule 2, occurred at two characters from the beginning of the input character string. Accordingly, not only does the hardware engine know the location of the end-of-match for the second regular expression (Rule 2), because it occurred on the current input character, it also now knows the start-of-match location in the input character string for this particular pattern.

It should be realized that the number of bits described herein for each entry in the special state table 4, including the start entry 6, the opcode, the start state register select, the terminal entry 8, the rule number and the start state register number, as well as for the current offset information stored in the start state registers 10, is described for illustrative purposes only, and may be a lesser, or greater, number of bits. For a typical TCP/IP character string to be searched, there are usually at most approximately 1500 characters. This would mean that, if the hardware engine and methodology of the present invention is to be applied to search patterns in such a typical TCP/IP character string, then the start state registers should be capable of storing about 13 bits of offset information or more in each register.

It should be understood that a compiler 12 generates the DFA next state table 2, the special state table 4 and the entries therein for the hardware engine that supports the start-of-match methodology of the present invention, knowing the patterns desired to be matched. The compiler 12 finds the start states and the terminal states and loads the corresponding start entries 6 and terminal entries 8 into the special state table 4 accordingly. A regular expression to DFA compiler, formed in accordance with the present invention, will now be described.

In the following text, the method by which the compiler 12 determines which DFA states are start states is presented. First, a general outline of the conversion of regular expressions into DFA's is presented, and then the modifications to the process necessary for labeling states as start states, in accordance with the present invention, is presented.

The production of a final multi-rule DFA is performed in several stages. First, each rule has the metacharacters ".*"

prepended to it and is transformed to an NFA using the well-known Thompson Construction. For a description of metacharacters and the Thompson Construction, reference should be made to *Compilers*, by A. V. Aho, R. Sethi, and J. D. Ullman, published by Addison-Wesley Publishing Company, 1986, the disclosure of which is incorporated herein by reference.

Second, each single rule NFA is converted into a DFA using the standard NFA to DFA algorithm, which is also commonly referred to as the subset construction algorithm. This algorithm creates a DFA state from one or more NFA states. For a more detailed explanation of this algorithm, reference should again be made to the aforementioned publication, *Compilers*.

Figure 5:
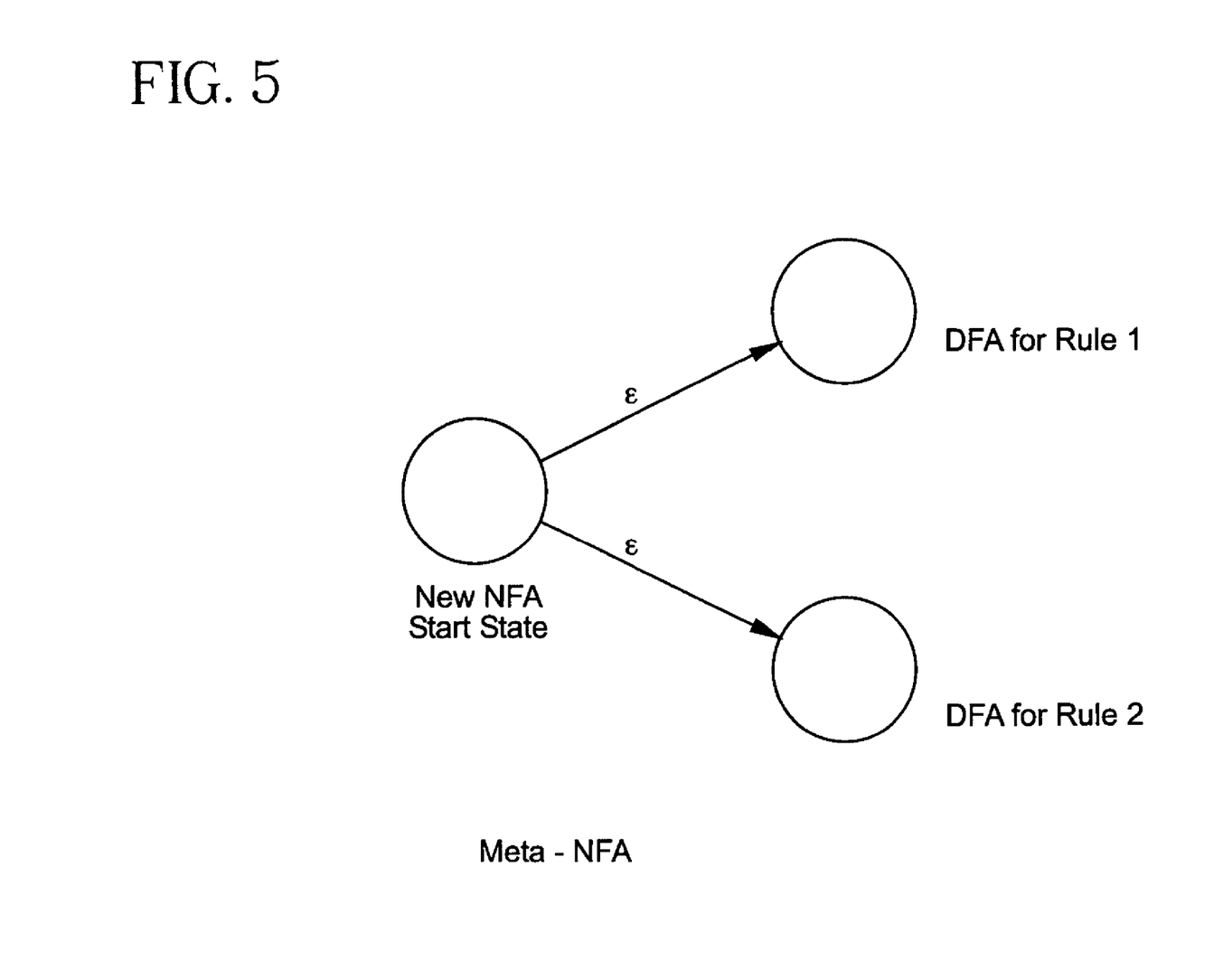
FIG. 5 is a partial state transition diagram illustrating one step in the method for producing a final multi-rule DFA.

The third step in the production of the final multi-rule DFA is to create a new NFA start state, and to insert an epsilon transition from this new NFA start state to each of the DFA's for each rule. This third step is illustrated by FIG. 5. This step creates a new, single "meta-NFA".

The fourth step in the process is to convert the meta-NFA to a DFA, again using the well-known subset construction algorithm.

The above-described procedure is modified in accordance with the present invention in the following manner for rules for which start-of-match data is requested. After an NFA is produced in the first step mentioned previously for each rule, it is analyzed for NFA start-of-match states. NFA start-of-match states are found as follows.

Starting at the initial state, an epsilon closure is generated. The 1-closure of that epsilon closure is then generated, and all states in the 1-closure but not in the initial epsilon closure are labeled as NFA start-of-match states.

In the second step of the production of the final multi-rule DFA mentioned previously, the NFA is converted to a DFA for each rule. Every DFA state that contains an NFA start state is a potential DFA start state for that particular rule. For all potential start states of a particular rule, the distance to the global start state (usually, the initial start state) is found. The closest potential start state to the global start state is chosen as a start state for that particular rule. If multiple potential start states are at the same distance from the global start state, they are all accepted as DFA start states. Finally, the chosen start states are carried through the third and fourth steps mentioned previously for producing the final multi-rule DFA.

The following is an example of how the modified regular expression to DFA compiler, formed in accordance with the present invention, operates. Assume that an input character stream is being searched for the unanchored regular expression "adam". Only a single rule is used in this example to facilitate an understanding of the invention. The expression is unanchored in the sense that it can occur anywhere in the character stream.

Figure 6:
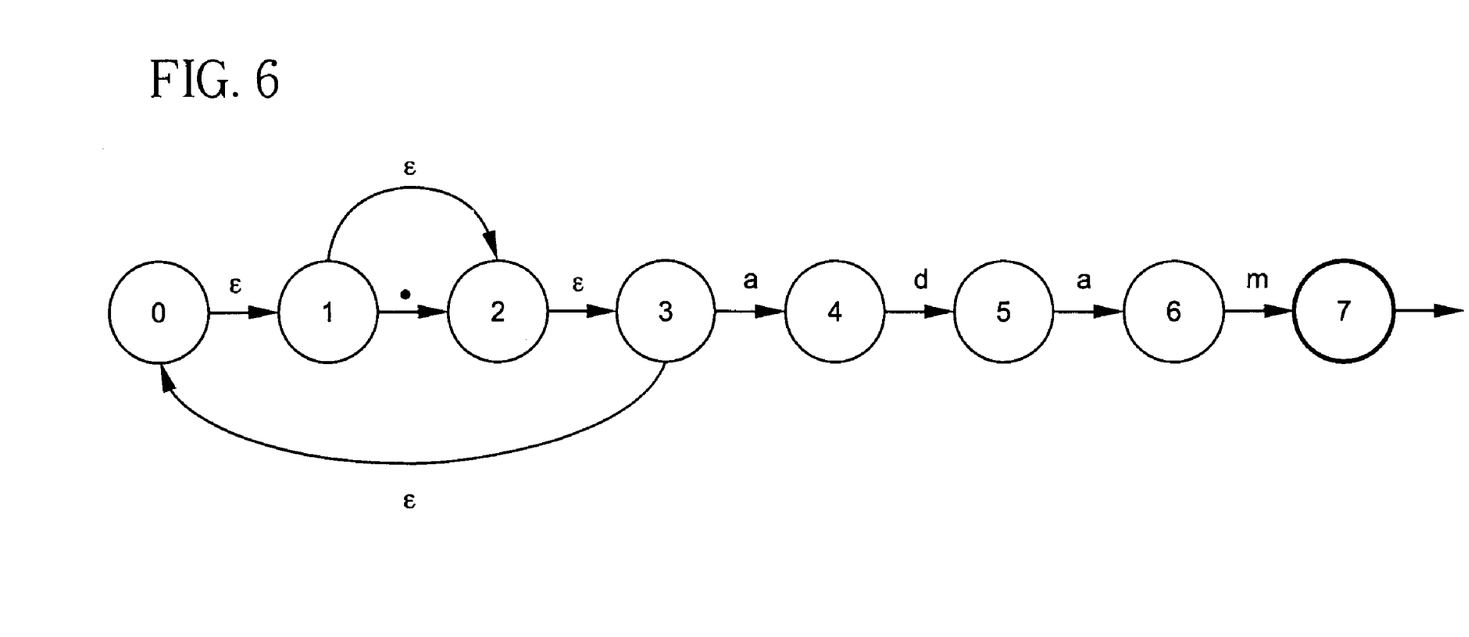
FIG. 6 is a state transition diagram of an illustrative example, showing how a compiler formed in accordance with the present invention determines the start-of-match states for a particular regular expression.

In accordance with the first step of the present invention, the compiler 12 prepends the metacharacters ".*" to the rule so that the regular expression becomes /.*adam/. The regular expression is then transformed to an NFA using the Thompson Construction. The NFA that is produced is illustrated by FIG. 6.

In accordance with the present invention, the epsilon closure of the NFA initial state 0 is generated. This epsilon closure contains NFA states 1, 2 and 3, as shown in FIG. 6. The 1-closure of that epsilon closure is now generated, and all states in the 1-closure but not in the initial epsilon closure are labeled as NFA start-of-match states. As shown in FIG. 6, the 1-closure of the NFA states 1, 2 and 3 include states 2, 3 and 4. Since state 4 is the only state in the 1-closure and not in the epsilon closure, it is the only NFA start-of-match state.

This procedure is repeated for each rule, and the third and fourth steps in the production of the final multi-rule DFA, i.e., creating a "meta-NFA" and converting it to a DFA, respectively, are now performed.

Through the above-described procedure, the compiler 12 of the present invention has now generated the proper values to place in the DFA next state table 2 and the special state table 4 to permit the pattern matcher to determine the location of the start of a match in an input character string for each regular expression.

Figure 7:
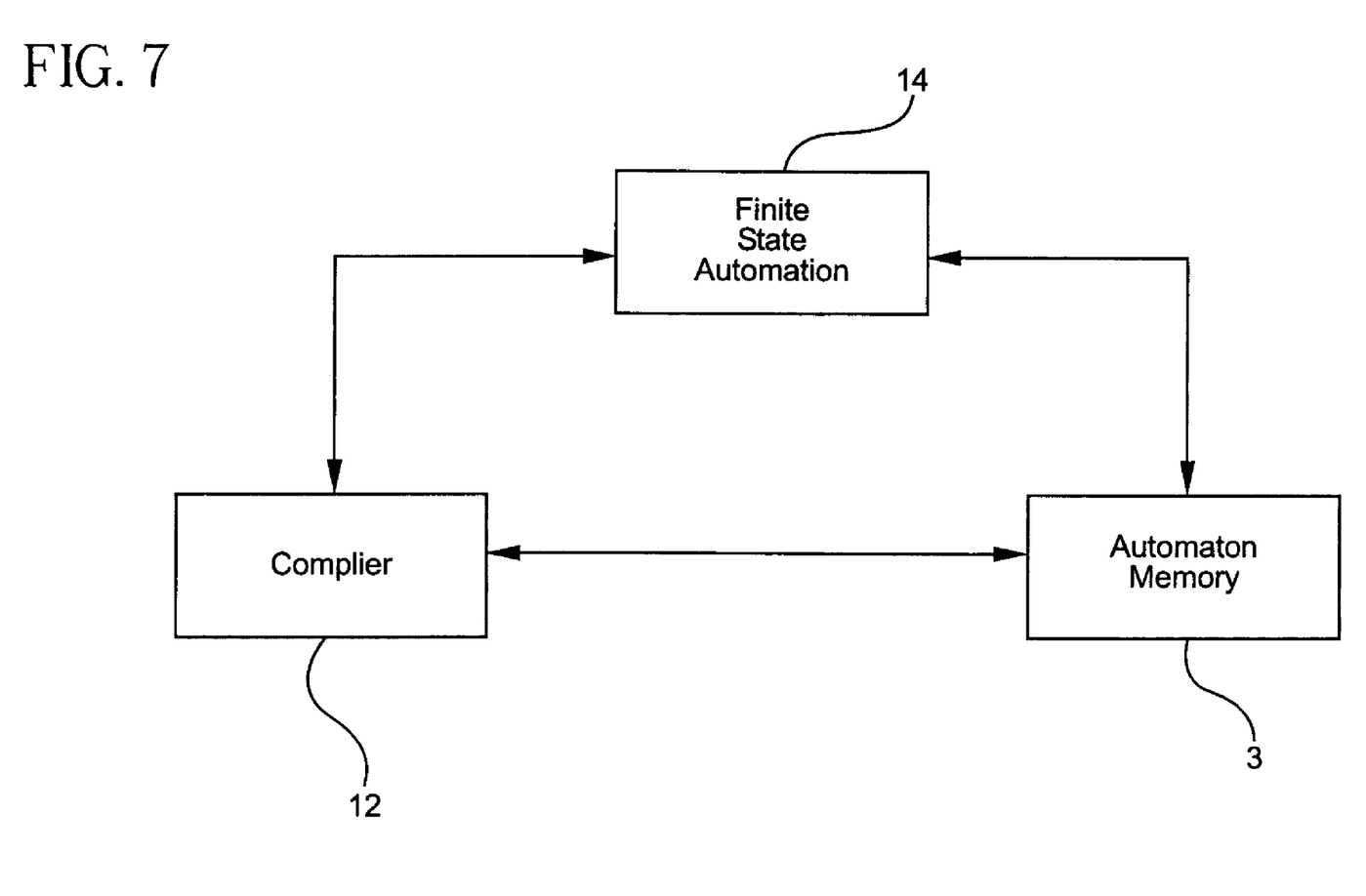
FIG. 7 is a block diagram of a system for matching a regular expression formed in accordance with one form of the present invention.

FIG. 7 illustrates a system formed in accordance with the present invention used for determining the start of a match of a regular expression. The system preferably includes some or all of the components described previously, such as a compiler 12, a finite state automaton 14, for example, the deterministic (or a non-deterministic) finite state automaton, and an automaton memory 3, each of which is preferably operatively linked to, and communicates with, one another.

As is seen from the above description, the present invention provides a method and system for matching a pattern in a character string and determining the start of the match. The method and system advantageously finds the start-of-match data for each rule of a multi-rule DFA in a single pass. What is more, this system and method will find a match after considering at most n characters, where n is the length of the input character string. Furthermore, if the DFA is implemented in hardware, the method and system of the present invention can perform the matches at gigabit and higher rates.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A method for determining the start states of each rule of a plurality of rules, each rule being utilized for pattern recognition of an input character string, and generating a multi-rule deterministic finite state automaton (DFA), which comprises the steps of:

prepending to each rule the metacharacters ".*" and transforming each rule prepended with the metacharacters to a non-deterministic finite state automaton (NFA) using a Thompson Construction;

analyzing the NFA for each rule to determine NFA start states by the following substeps:

a) producing an epsilon closure starting at the initial state of the NFA;

b) producing a 1-closure of the initial epsilon closure;

c) comparing the states in the initial epsilon closure with the states in the 1 closure; and d) determining as NFA start states all states in the 1-closure which are not in the initial epsilon closure;

converting the NFA for each rule into a DFA using an NFA to DFA algorithm, thereby creating a DFA state from one or more NFA states;

for each DFA state that contains an NFA start state, determining the distance of the DFA state from the global start of the DFA for each rule;

comparing the distances of the DFA start states that contain an NFA start state from the global start state; choosing as a DFA start state the DFA state containing an NFA start state which is closest to the global start state;

if more than one DFA state containing an NFA start state have the same closest distance to the global start state, accepting as DFA start states each of said closest DFA states having the same closest distance to the global start state;

creating a new NFA start state and inserting an epsilon transition from the new NFA start state to each of the DFA's for each rule, thereby creating a meta-NFA;

converting the meta-NFA to a final multi-rule DFA storing said multi-rule DFA in a memory; and applying said final multi-rule DFA to conduct pattern matching on said input character string.

* * * * *